Aug. 18, 1959  G. M. HIXON  2,900,617
CABLE CONNECTOR
Filed Dec. 19, 1955  2 Sheets-Sheet 1
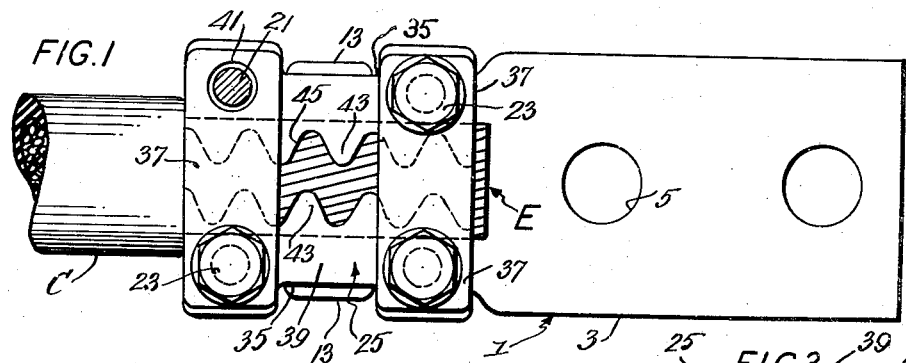
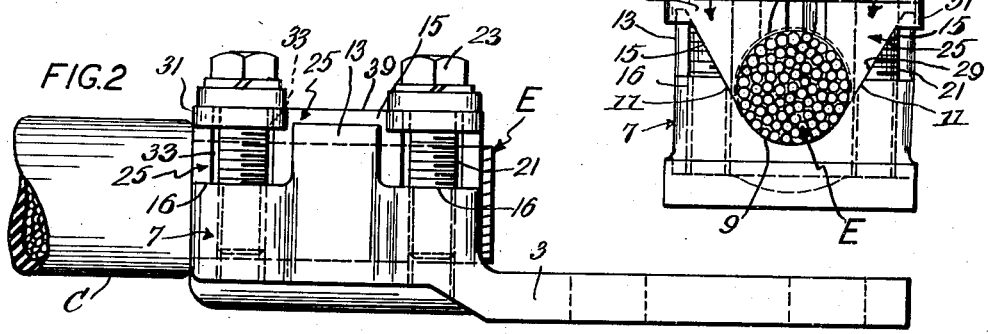
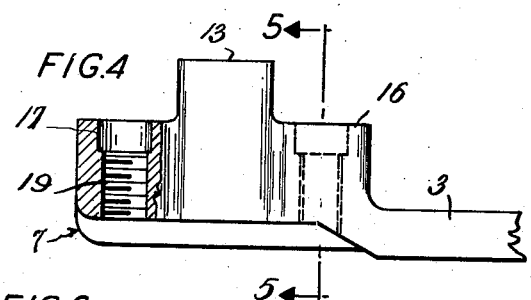
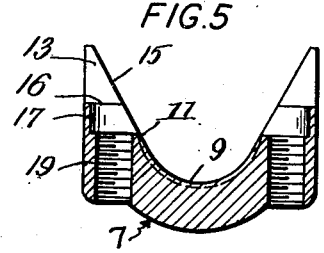
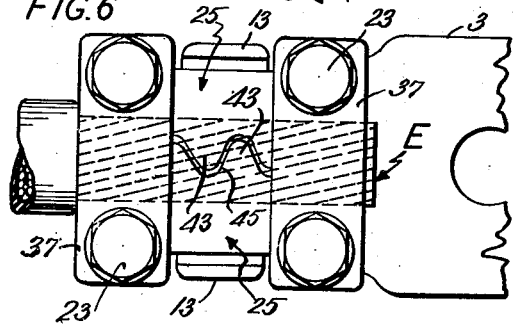
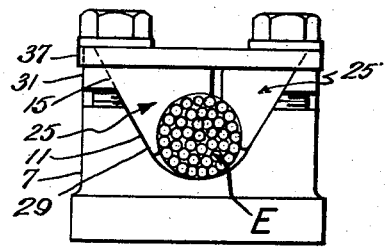
INVENTOR
GEORGE M. HIXON
BY Emery Booth
Townsend Miller & Weidner ATTYS.

Aug. 18, 1959     G. M. HIXON     2,900,617
CABLE CONNECTOR
Filed Dec. 19, 1955
2 Sheets-Sheet 2
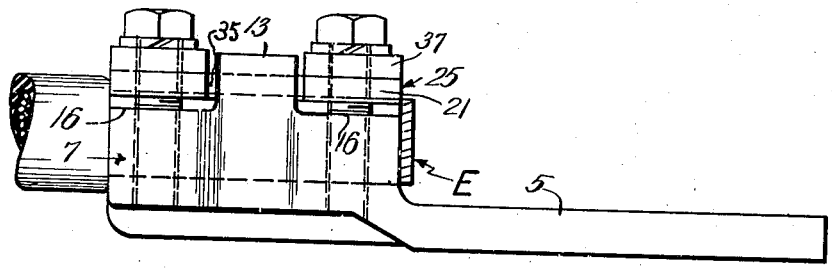
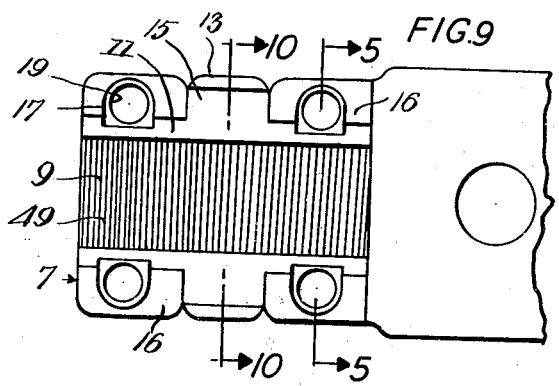
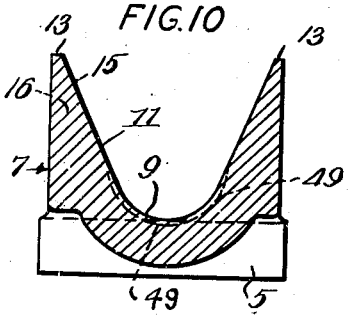
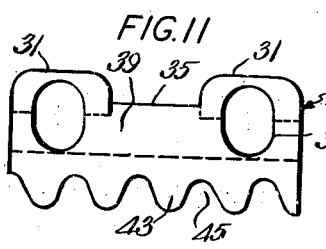
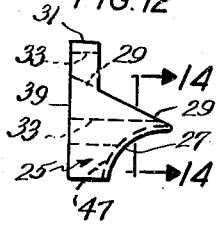
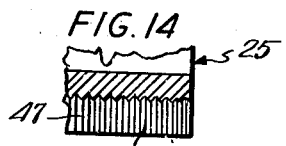
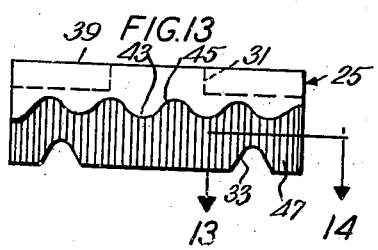
INVENTOR
GEORGE M. HIXON United States Patent Office 2,900,617
Patented Aug. 18, 1959

2,900,617
CABLE CONNECTOR

George M. Hixon, Braintree, Mass., assignor to Trego, Inc., Boston, Mass., a corporation of Massachusetts Application December 19, 1955, Serial No. 553,800

2 Claims. (Cl. 339—265)

My invention relates to cable connectors.

The invention has among its objects a cable connector having novel means for clamping it to cables of a wide range of diameters with provision for preventing separation of the strands of the cable and their springing away from the body of the cable under the clamping pressure.

The invention however will be best understood from the following description when read in the light of the accompanying drawings of a specific embodiment of the invention selected for illustrative purposes, while the scope of the invention will be more particularly pointed out in the appended claims.

In the drawings:

Fig. 1 is a plan view of a cable connector according to the invention with the cable attached thereto and with parts broken away;

Fig. 2 is a side elevation of the cable connector according to Fig. 1;

Fig. 3 is an end elevation of the cable connector according to Figs. 1 and 2 as viewed from the right of Fig. 2;

Fig. 4 is a side elevation, with parts in section, of the body portion of the cable connector according to Figs. 1, 2 and 3;

Fig. 5 is a section on the line 5—5 of Fig. 4, that section line also being applied to Fig. 9 for convenience in following the drawings;

Fig. 6 is a plan view, Fig. 7 an end elevation, and Fig. 8 a side elevation, corresponding to Figs. 1, 3 and 2, respectively, showing the cable connector according to Figs. 1, 2 and 3 connected to a cable of smaller diameter than that of the cable shown in Figs. 1, 2 and 3, parts being broken away in Fig. 6;

Fig. 9 is a plan view of the body portion of the cable connector according to Figs. 4 and 5, with parts broken away;

Fig. 10 is a section on the line 10—10 of Fig. 9;

Fig. 11 is a plan view of one of the clamping members of the connector according to Figs. 1, 2 and 3;

Fig. 12 is an end elevation of the member according to Fig. 11;

Fig. 13 is a side elevation of the member according to Fig. 11 as viewed from the bottom of Fig. 11; and Fig. 14 is a section on the line 14—14 of Fig. 13, that section line also being applied to Fig. 12 for convenience in following the drawings.

Referring to the drawings, the cable connector shown constitutes the terminal for the "skinned" end E of an insulated stranded cable C. The body portion 1 of the connector comprises the flattened part 3 adapted to lie against the flat side of a bus bar or the like and be secured thereto in the usual manner by bolts passing through perforations 5 formed in said part.

At one end the flattened part 3 is shown as integrally carrying an elongated body portion 7 formed throughout its length with an open top groove presenting at its bottom, as viewed in transverse cross-section, an arcuate surface 9 against which the under side of the cable portion E is adapted to lie, and presenting upwardly inclined and diverging side wall surfaces 11. Intermediate its length the body portion 7 is shown as formed at each side thereof with an upwardly projecting lug 13, the inner sides 15 of these lugs forming upward continuations of the side wall surfaces 11 of the groove in said body portion. At each of opposite sides of the lugs 13 the body portion 7 presents at each of its opposite end portions upper flat surfaces 16 which are recessed as indicated at 17 (Fig. 5), and extending downward from the bottoms of these recesses are the tapped holes 19 for screw-threadedly receiving the screw-threaded shank portions 21 of clamping bolts having the heads 23.

Received in the open top of the cable receiving groove of the body portion 7 of the connector, and coextensive in length with said portion, are shown a pair of oppositely positioned clamping members 25 each as viewed in transverse cross-section being formed with an arcuate surface 27 for engaging the upper surface part of the cable end portion E and the adjacent upper side surfaces of that end portion. At its outer side each member 25 is shown as formed with an inclined surface 29 complementary to and slidable on the aligned surfaces 11 and 15 of the body portion 7 and lugs 13, respectively. As best shown in Fig. 11, each member 25 at each end thereof is formed at its outer side with a laterally projecting lug 31 which and the adjacent portions of the member are formed with the through perforation 33 for loosely receiving the shanks 21 of the hereinbefore mentioned clamping bolts, these perforations transversely of the members being of elongated cross-section to permit the members to slide up and down the adjacent inclined surface of the body portion of the connector when the bolts are inserted, the lugs 31 on each member 25 forming between them a notch 35 which receives the adjacent upwardly extending lug 13 so as to prevent substantial longitudinal movement of the member relative to the body portion of the connector for facilitating assembly of the parts.

In the present embodiment of the invention are shown cross bars 37 extending transversely over the members 25 and resting upon their upper flat surfaces 39 at the opposite ends of said members, these cross bars being formed with perforations 41 (Fig. 1) through which the shanks 21 of the clamping bolts extend into the aligned perforations 33 and 19 of the members 25 and body portion 7, respectively, so that by tightening the bolts the members 25 may be forcibly drawn toward said body portion for clamping the cable between said members and between said members and said body portion.

It will also be observed from a comparison of Figs. 3 and 7 that when a cable of maximum diameter is gripped by the connector as shown by Fig. 3 the inclined surfaces 29 of each member 25 have but little contact with the inclined surfaces 11 of the body portion 7 but do have a wide extent of contact with the inclined surfaces 15 of the lugs 13. Hence when the cable is of large diameter the lugs when the clamping bolts are tightened prevent any tendency of the members 25 to tilt relative to the body portion, and secure an efficient clamping operation. On the other hand, when the cable of small diameter is gripped the lugs 31 and cross bars 37 are positioned below the tops of the lugs 13 as clearly shown by Fig. 8, under which conditions the inclined surfaces 29 of the members 25 have a bearing of wide extent on both the inclined surfaces 11 of the groove in the body portion and the inclined surfaces 15 of the lugs 13. The presence of the lugs 13 therefore acts to secure an efficient clamping operation while making the connector of compact construction.

As shown, the clamping members 25 at their upper inner edges are each formed with a row of projections 43 arranged in spaced relation to form between those of each pair of them intervening recesses 45. When the connector has clamped thereto a cable of the maximum diameter to which it is adaptable the parts are in approximately their positions shown by Figs. 1, 2 and 3, and when it has clamped thereto a cable of the minimum diameter to which it is adaptable the parts are in approximately their positions shown by Figs. 6, 7 and 8, under which latter conditions the projections 43 of each member 25 enter a recess 45 of the opposite member. The projections 43 increase the clamping effect of the members 25 on the cable over that which would be effected if the projections were omitted. Further, the squeezing of the cable at its upper portion, and particularly the squeezing between the two members 25, tends to separate and spring the strands at the upper portion of the cable upward, and these projections prevent such separation and springing. It will be observed that if the projections were omitted, and the inner upper edges of the two members 25 were straight and brought close together to permit the connector to clamp the cable of minimum diameter shown by Figs. 6 and 7, those edges of the members would be positioned widely apart when the parts are in their positions shown by Figs. 1, 2 and 3 to permit a cable of the maximum diameter to be clamped to the connector, with the result that with a cable of maximum diameter the clamping effect of the members on the cable would be much reduced and the strands at the upper portions of the cable between those edges would separate and spring upward, when the cable is of large diameter, due to the distorting effect of the members on the cable. The provision of the projections and intervening recesses therefore increases the adaptability of the connector to cables of widely differing diameters.

As further illustrated, the arcuate surfaces 27 of the members 25 are formed with corrugations 47 as best shown in Figs. 13 and 14, while the cable contacting surfaces of the groove in the body portion 7 of the connector are formed with like corrugations 49 as best shown in Figs. 9 and 10. These corrugated surfaces of the parts act to cause them better to grip the cable.

It will be understood that wtihin the scope of the appended claims wide deviations may be made from the form of the invention herein described without departing from the spirit of the invention.

I claim:

1. A cable connector having, in combination, a body portion formed to provide an elongated open top groove having, in transverse cross-section, an arcuate bottom surface on which the lower surface portion of a longitudinally extending length of cable received by said groove is adapted to rest, and having upwardly relatively widely diverging side wall surfaces tangent to said arcuate bottom surface, the angle at which said side wall surfaces diverge being such as to cause the points of tangency to lie below the horizontal plane that includes the center of curvature of said arcuate bottom surface; a pair of oppositely arranged members in said groove, each of which members has a longitudinally extending inclined side surface conforming to and slidable downwardly on one of said diverging side wall surfaces of said groove, and each having a longitudinally extending, downwardly and laterally facing surface which in transverse cross-section is concavely arcuate and extends for substantially the full width of the under side of said member, and at the lower edge thereof substantially intersects the inclined surface of said member so as to adapt such surface to contact portions of the cable extending to below said plane; and means for forcibly sliding said members on said inclined surfaces of said groove for causing such surfaces by coaction with the inclined surfaces of said members to act as wedges for moving said members downward and laterally toward each other for downward and inward gripping of the cable.

2. A cable connector having, in combination, a body portion formed to provide an elongated open top groove having, in transverse cross-section, an arcuate bottom surface on which the lower surface portion of a longitudinally extending length of cable received by said groove is adapted to rest, and having upwardly relatively widely diverging side wall surfaces tangent to said arcuate bottom surface, the angle at which said side wall surfaces diverge being such as to cause the points of tangency to lie below the horizontal plane that includes the center of curvature of said arcuate bottom surface; a pair of oppositely arranged members in said groove, each of which members has a longitudinally extending inclined side surface conforming to and slidable downward on one of said diverging side wall surfaces of said groove, and each having a longitudinally extending, downwardly and laterally facing surface which in transverse cross-section is concavely arcuate and extends for subtsantially the full width of the under side of said member, and at one edge thereof substantially intersects the inclined surface of said member so as to adapt such surface to contact portions of the cable extending to below said plane; means for forcibly sliding said members on said inclined surfaces of said groove for causing such surfaces by coaction with the inclined surfaces of said members to act as wedges for moving said members downward and laterally toward each other for gripping the cable; and the upper inner edge portions of the oppositely arranged members being formed with cable engaging projections for preventing separation of adjacent strands of the cable when said members are widely spaced to accommodate a cable of relatively large diameter, the projections of each member extending toward the other member and those of each member being positioned in spaced relation to form intervening recesses for reception of the projections of the other member when said members are positioned close to each other for accommodating a cable of relatively small diameter.

References Cited in the file of this patent

UNITED STATES PATENTS

| | | |
|---|---|---|
| 834,924 | Meech | Nov. 6, 1906 |
| 1,248,528 | Nagel | Dec. 4, 1917 |
| 1,582,340 | Milne | Apr. 27, 1926 |
| 1,729,785 | Lapp | Oct. 1, 1929 |
| 1,978,932 | Cafiero | Oct. 30, 1934 |
| 2,086,148 | Young | July 6, 1937 |
| 2,771,591 | Vordtriede | Nov. 20, 1956 |

FOREIGN PATENTS

| | | |
|---|---|---|
| 176,002 | Germany | Sept. 3, 1906 |